US009656676B2

(12) United States Patent
Mitsuyasu et al.

(10) Patent No.: US 9,656,676 B2
(45) Date of Patent: May 23, 2017

(54) VEHICLE TRAVEL CONTROL DEVICE

(71) Applicants: Masaki Mitsuyasu, Kawasaki (JP); Jonggap Kim, Hadano (JP); Rentaro Kuroki, Susono (JP); Takuya Hirai, Susono (JP); Masaki Matsunaga, Odawara (JP); Yasunari Kido, Hadano (JP); Takeaki Suzuki, Susono (JP); Takayuki Kogure, Susono (JP); Yukari Okamura, Gotenba (JP); Akihiro Sato, Nagoya (JP); Yusuke Kinoshita, Toyota (JP)

(72) Inventors: Masaki Mitsuyasu, Kawasaki (JP); Jonggap Kim, Hadano (JP); Rentaro Kuroki, Susono (JP); Takuya Hirai, Susono (JP); Masaki Matsunaga, Odawara (JP); Yasunari Kido, Hadano (JP); Takeaki Suzuki, Susono (JP); Takayuki Kogure, Susono (JP); Yukari Okamura, Gotenba (JP); Akihiro Sato, Nagoya (JP); Yusuke Kinoshita, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 140 days.

(21) Appl. No.: 14/439,380

(22) PCT Filed: Oct. 31, 2012

(86) PCT No.: PCT/JP2012/078234
§ 371 (c)(1),
(2) Date: Apr. 29, 2015

(87) PCT Pub. No.: WO2014/068726
PCT Pub. Date: May 8, 2014

(65) Prior Publication Data
US 2015/0291165 A1    Oct. 15, 2015

(51) Int. Cl.
G06F 7/00        (2006.01)
B60W 30/182     (2012.01)
(Continued)

(52) U.S. Cl.
CPC .......... B60W 30/182 (2013.01); B60W 10/06 (2013.01); B60W 10/10 (2013.01);
(Continued)

(58) Field of Classification Search
CPC .... B60W 30/182; B60W 10/06; B60W 10/10; B60W 30/18172; B60W 2710/06;
(Continued)

(56) References Cited

U.S. PATENT DOCUMENTS 8,574,125 B2 * 11/2013 Nedorezov ........... F02D 41/065
                                                           477/169
9,097,315 B2 * 8/2015 Aoyama .................. F16H 9/16
(Continued)

FOREIGN PATENT DOCUMENTS

JP    2002-227885 A    8/2002
JP    2005-233252 A    9/2005
(Continued)

Primary Examiner — David J Hlavka
(74) Attorney, Agent, or Firm — Oliff PLC

(57) ABSTRACT

A running control device of a vehicle including an engine, a connecting/disconnecting device separating the engine and wheels, and a transmission transmitting power of the engine toward the wheels, the running control device of a vehicle being configured to execute a normal running mode performed by using the power of the engine with the engine and the wheels coupled, a free-run inertia running mode that is an inertia running mode performed by separating the engine and the wheels and stopping the engine during running, and a neutral inertia running mode that is an inertia running mode performed by separating the engine and the wheels and operating the engine in a self-sustaining manner during (Continued)

running, the running control device of a vehicle setting a gear ratio of the transmission on a high vehicle speed side in the case of return from the free-run inertia running mode to the normal running mode.

7 Claims, 7 Drawing Sheets

(51) Int. Cl.
*B60W 30/18* (2012.01)
*F16H 61/02* (2006.01)
*B60W 10/06* (2006.01)
*B60W 10/10* (2012.01)
*F16H 63/50* (2006.01)
*F16H 59/18* (2006.01)

(52) U.S. Cl.
CPC ... *B60W 30/18172* (2013.01); *F16H 61/0213* (2013.01); *B60W 2030/1809* (2013.01); *B60W 2030/18081* (2013.01); *B60W 2710/021* (2013.01); *B60W 2710/06* (2013.01); *B60W 2710/10* (2013.01); *B60W 2710/105* (2013.01); *F16H 63/50* (2013.01); *F16H 2059/186* (2013.01); *F16H 2061/0234* (2013.01)

(58) Field of Classification Search
CPC . B60W 2710/021; B60W 2030/18081; B60W 2710/105; F16H 61/0213; F16H 2061/0234; F16H 2059/186; F16H 63/50
See application file for complete search history.

(56) References Cited

U.S. PATENT DOCUMENTS

| | | | |
|---|---|---|---|
| 9,327,707 B2* | 5/2016 | Hawkins | B60W 10/06 |
| 9,352,738 B2* | 5/2016 | Kellerman | B60W 10/02 |
| 2007/0184936 A1* | 8/2007 | Nakayama | F16H 61/66272 477/44 |
| 2012/0135840 A1 | 5/2012 | Tatewaki et al. | |

FOREIGN PATENT DOCUMENTS

| | | |
|---|---|---|
| JP | 2012-036912 A | 2/2012 |
| JP | 2012-112461 A | 6/2012 |
| JP | 2012-149657 A | 8/2012 |

* cited by examiner

FIG.2

| RUNNING MODE | ENGINE 14 | CLUTCH C1 |
|---|---|---|
| NORMAL RUNNING | OPERATED | ENGAGED |
| FREE-RUN INERTIA RUNNING | F/C; ROTATION STOP | RELEASED |
| NEUTRAL INERTIA RUNNING | IDLE ROTATION | RELEASED |

VEHICLE TRAVEL CONTROL DEVICE

TECHNICAL FIELD

The present invention relates to a running control device of a vehicle capable of executing an inertia running mode with an engine and wheels separated and particularly to a technique at the time of return from the inertia running mode to a normal running mode with the engine and the wheels coupled.

BACKGROUND ART

To extend a running distance and improve fuel consumption in a vehicle including a connecting/disconnecting device (e.g., a clutch) separating an engine and wheels and a transmission transmitting the power of the engine toward the wheels, it is conceivable that the vehicle is allowed to perform an inertia running mode when a predetermined condition is satisfied during a normal running mode performed by the power of the engine while the engine and the wheels are coupled. For example, in Patent Document 1, a control device of a vehicle is proposed that releases a clutch during running of the vehicle to separate an engine and wheels for allowing the vehicle to perform the inertia running mode on the condition of accelerator-off etc. Patent Document 1 describes that a state of the engine during the inertia running mode is an "idle state" or a "stop state" without particular distinction. In Patent Document 1, conditions for canceling such an inertia running mode (i.e., conditions for returning to a normal running mode) are exemplified as accelerator-on, brake-on, steering of a predetermined steering angle or more, a shift lever operation, an inter-vehicle distance of a predetermined value or less, a reduction in vehicle speed, an increase in vehicle speed on a descending road, etc.

PRIOR ART DOCUMENT

Patent Document

Patent Document 1: Japanese Laid-Open Patent Publication No. 2002-227885

SUMMARY OF THE INVENTION

Problem to Be Solved by the Invention

In the case of return from the inertia running mode to the normal running mode because an accelerator is turned on during the inertia running mode performed with an engine and wheels separated, it is considered that a user desires prompt acceleration. To satisfy such a user's request, it is conceivable that an upper limit value of a drive force (having the same meaning as a drive torque etc.) capable of being generated (i.e., an absolute value of the drive force capable of being generated) is preliminarily made larger by setting a gear ratio of a transmission on a low vehicle speed side at the time of return from the inertia running mode so as to enhance acceleration performance after the drive force starts being generated. However, no consideration is given to the fact that a procedure of returning from the inertia running mode differs depending on whether the state of the engine during the inertia running mode is set to the "idle state" or the "stop state". Specifically, in the procedure when the state of the engine is set to the "idle state", after the return condition is satisfied, synchronization control is provided that matches an engine rotation speed to an output-side rotation speed of a clutch before the clutch is engaged to accelerate a vehicle. On the other hand, in the procedure when the state of the engine is set to the "stop state", after the return condition is satisfied, the engine is started before the synchronization control is provided and the clutch is engaged to accelerate a vehicle. Therefore, if the engine is in the "stop state", the engine must be started at the time of return from the inertia running mode and, therefore, the responsiveness until start of generation of a drive force is deteriorated as compared to when the engine is in the "idle state".

It is newly discovered that, if the gear ratio of the transmission is set on the low vehicle speed side in the case of return from the "stop state" in an attempt to recover the inferior responsiveness until the start of generation of the drive force by enhancing the acceleration performance, since the engine rotation speed during the synchronization control is made higher, some vehicle types require a time for the synchronization control, deteriorating the responsiveness instead. On the other hand, it is newly discovered that, if the gear ratio of the transmission is set on the high vehicle speed side in the case of return from the "idle state" so as to improve the responsiveness at the time of return from the "stop state" in accordance with the return from the "stop state", an absolute value of the drive force capable of being generated after the return becomes smaller and makes it difficult to acquire desired acceleration, resulting in deterioration in acceleration performance. Particularly, in the case of the "idle state", a user expects that the desired drive force is generated because the engine is originally operating and, therefore, a phenomenon of a small drive force at the time of return to the normal running mode tends to give a feeling of strangeness to the user. The problem as described above is unknown and no proposal has hitherto been made on setting a gear ratio of the transmission hardly giving a feeling of strangeness to the user at the time of return to the normal running mode by focusing attention on a difference generated depending on whether the engine during the inertia running mode is in the "stop state" or the "idle state".

The present invention was conceived in view of the situations and it is therefore an object of the present invention to provide a running control device of a vehicle capable of preventing a user from having a feeling of strangeness at the time of return to a normal running mode from an inertia running mode performed with an engine and wheels separated, in terms of the responsiveness until the start of generation of a drive force and the acceleration performance after the start of generation of the drive force.

Means for Solving the Problem

To achieve the object, the first aspect of the invention provides a running control device of a vehicle including (a) an engine, a connecting/disconnecting device separating the engine and wheels, and a transmission transmitting power of the engine toward the wheels, the running control device of a vehicle being configured to execute a normal running mode performed by using the power of the engine with the engine and the wheels coupled, a free-run inertia running mode that is an inertia running mode performed by separating the engine and the wheels and stopping the engine during running, and a neutral inertia running mode that is an inertia running mode performed by separating the engine and the wheels and operating the engine in a self-sustaining manner during running, (b) the running control device of a vehicle setting a gear ratio of the transmission on a high vehicle speed side in the case of return from the free-run inertia running mode to the normal running mode as compared to the case of return from the neutral inertia running mode to the normal running mode.

Effects of the Invention

As described above, by changing the gear ratio of the transmission at the time of return to the normal running mode based on the state of the engine during the inertia running mode, the gear ratio on the high vehicle speed side (high gear side) is used in the case of the free-run inertia running mode with the engine stopped for returning to the normal running mode so as to put importance on the time until synchronization of the engine rotation speed when the engine and the wheels are coupled to each other (in other words, the responsiveness until the start of generation of the drive force), while the gear ratio on the low vehicle speed side (low gear side) is used in the case of the neutral inertia running mode performed by operating the engine in a self-sustaining manner for returning to the normal running mode so as to put importance on the absolute value of the drive force capable of being generated after the return (in other words, the acceleration performance after the start of generation of the drive force). Therefore, a user can be prevented from having a feeling of strangeness at the time of return from the inertia running mode to the normal running mode in terms of the responsiveness and the acceleration performance.

The second aspect of the invention provides the running control device of a vehicle recited in the first aspect of the invention, wherein the running control device includes a condition that is an increase in a drive demand amount as one of a plurality of conditions for returning to the normal running mode, the running control device executes a control of setting the gear ratio of transmission on the high vehicle speed side at the time of return to the normal running mode associated with the increase in the drive demand amount, and the running control device sets the gear ratio of the transmission to a gear ratio for the normal running mode at the time of return to the normal running mode associated with a condition other than the increase in the drive demand amount. Consequently, although if control of changing the gear ratio of the transmission at the time of return to the normal running mode based on the state of the engine during inertia running mode is provided when it is not the time of return to the normal running mode associated with an increase in the drive demand amount, the shock generated when the engine is coupled to the wheels varies due to a difference in the state of the engine and possibly gives a feeling of strangeness to a user, the feeling of strangeness is avoided because the control is not provided so as not to put importance on the responsiveness until start of generation of the drive force when it is not the time of return to the normal running mode associated with an increase in the drive demand amount.

The third aspect of the invention provides the running control device of a vehicle recited in the first or second aspect of the invention, wherein the running control device of a vehicle has a predefined relationship determining a gear ratio of the transmission for the normal running mode, and wherein the running control device sets the gear ratio of the transmission on the high vehicle speed side relative to the gear ratio determined from the predefined relationship in the case of return from the free-run inertia running mode to the normal running mode as compared to the case of return from the neutral inertia running mode to the normal running mode. Consequently, the gear ratio of the transmission can certainly be set on the high vehicle speed side in the case of return from the free-run inertia running mode to the normal running mode as compared to the case of return from the neutral inertia running mode to the normal running mode.

The fourth aspect of the invention provides the running control device of a vehicle recited in any one of the first to third aspects of the invention, wherein the running control device of a vehicle has a predefined relationship for free-run inertia running mode determining a gear ratio of the transmission at the time of return from the free-run inertia running mode to the normal running mode and a predefined relationship for neutral inertia running mode determining a gear ratio of the transmission at the time of return from the neutral inertia running mode to the normal running mode, and wherein the relationship for free-run inertia running mode has a gear ratio of the transmission set on the high vehicle speed side as compared to the relationship for neutral inertia running mode. Consequently, the gear ratio of the transmission can certainly be set on the high vehicle speed side in the case of return from the free-run inertia running mode to the normal running mode as compared to the case of return from the neutral inertia running mode to the normal running mode.

To achieve the object, the fifth aspect of the invention provides a running control device of a vehicle including (a) an engine, a connecting/disconnecting device separating the engine and wheels, and a transmission transmitting power of the engine toward the wheels, the running control device of a vehicle being configured to execute a normal running mode performed by using the power of the engine with the engine and the wheels coupled, a free-run inertia running mode that is an inertia running mode performed by separating the engine and the wheels and stopping the engine during running, and a neutral inertia running mode that is an inertia running mode performed by separating the engine and the wheels and operating the engine in a self-sustaining manner during running, (b) the running control device of a vehicle having a predefined relationship determining a gear ratio of the transmission for the normal running mode, (c) the gear ratio of the transmission being set on a high vehicle speed side relative to the gear ratio determined from the predefined relationship in the case of return from the free-run inertia running mode to the normal running mode as compared to the case of return from the neutral inertia running mode to the normal running mode.

As described above, by changing the gear ratio of the transmission at the time of return to the normal running mode based on the state of the engine during the inertia running mode, the gear ratio on the high vehicle speed side is used in the case of the free-run inertia running mode with the engine stopped for returning to the normal running mode so as to put importance on the time until synchronization of the engine rotation speed when the engine and the wheels are coupled to each other (in other words, the responsiveness until the start of generation of the drive force), while the gear ratio on the low vehicle speed side is used in the case of the neutral inertia running mode performed by operating the engine in a self-sustaining manner for returning to the normal running mode so as to put importance on the absolute value of the drive force capable of being generated after the return (in other words, the acceleration performance after the start of generation of the drive force). Therefore, a user can be prevented from having a feeling of strangeness at the time of return from the inertia running mode to the normal running mode in terms of the responsiveness and the acceleration performance.

To achieve the object, the sixth aspect of the invention provides a running control device of a vehicle including (a) an engine, a connecting/disconnecting device separating the engine and wheels, and a transmission transmitting power of the engine toward the wheels, the running control device of a vehicle being configured to execute a normal running mode performed by using the power of the engine with the engine and the wheels coupled, a free-run inertia running mode that is an inertia running mode performed by separating the engine and the wheels and stopping the engine during running, and a neutral inertia running mode that is an inertia running mode performed by separating the engine and the wheels and operating the engine in a self-sustaining manner during running, the running control device of a vehicle having (b) a predefined relationship for free-run inertia running mode determining a gear ratio of the transmission at the time of return from the free-run inertia running mode to the normal running mode and (c) a predefined relationship for neutral inertia running mode determining a gear ratio of the transmission at the time of return from the neutral inertia running mode to the normal running mode, (d) the relationship for free-run inertia running mode having the gear ratio of the transmission set on the high vehicle speed side as compared to the relationship for neutral inertia running mode.

As described above, by changing the gear ratio of the transmission at the time of return to the normal running mode based on the state of the engine during the inertia running mode, the gear ratio on the high vehicle speed side is used in the case of the free-run inertia running mode with the engine stopped for returning to the normal running mode so as to put importance on the time until synchronization of the engine rotation speed when the engine and the wheels are coupled to each other (in other words, the responsiveness until the start of generation of the drive force), while the gear ratio on the low vehicle speed side is used in the case of the neutral inertia running mode performed by operating the engine in a self-sustaining manner for returning to the normal running mode so as to put importance on the absolute value of the drive force capable of being generated after the return (in other words, the acceleration performance after the start of generation of the drive force). Therefore, a user can be prevented from having a feeling of strangeness at the time of return from the inertia running mode to the normal running mode in terms of the responsiveness and the acceleration performance.

The seventh aspect of the invention provides the running control device of a vehicle recited in any one of the first to sixth aspects of the invention, wherein a gear ratio of the transmission at the time of return from the neutral inertia running mode to the normal running mode is a gear ratio of the transmission for the normal running mode. Consequently, the gear ratio of the transmission can be set on the high vehicle speed side in the case of return from the free-run inertia running mode to the normal running mode.

BRIEF DESCRIPTION OF THE DRAWINGS

FIG. 2 is a diagram for explaining three running modes performed in the vehicle depicted in FIG. 1.

MODE FOR CARRYING OUT THE INVENTION

In the present invention, preferably, the transmission is made up of an automatic transmission or of an automatic transmission having a fluid power transmission device. For example, this automatic transmission is made up of a known planetary gear type automatic transmission, a synchronous meshing type parallel two-shaft automatic transmission that is a known synchronous meshing type parallel two-shaft transmission and that has gear stages automatically switched by a hydraulic actuator, a so-called DCT (Dual Clutch Transmission) that is a synchronous meshing type parallel two-shaft automatic transmission and that is of a type having two systems of input shafts, or a known belt type continuously variable transmission or a toroidal type continuously variable transmission, etc.

Although the connecting/disconnecting device is preferably implemented by using a friction engagement type clutch or brake, connecting/disconnecting devices of various types can be employed including electrically controlling a reaction force to connect and disconnect the power transmission. An automatic transmission including pluralities of clutches and brakes and capable of being neutral is also usable.

Preferably, the engine is an internal combustion engine such as a gasoline engine and a diesel engine generating power from combustion of fuel, for example. Although the vehicle may include at least the engine as a drive force source, the vehicle may include another drive force source such as an electric motor in addition to the engine.

An example of the present invention will now be described in detail with reference to the drawings.

FIRST EXAMPLE

Figure 1:
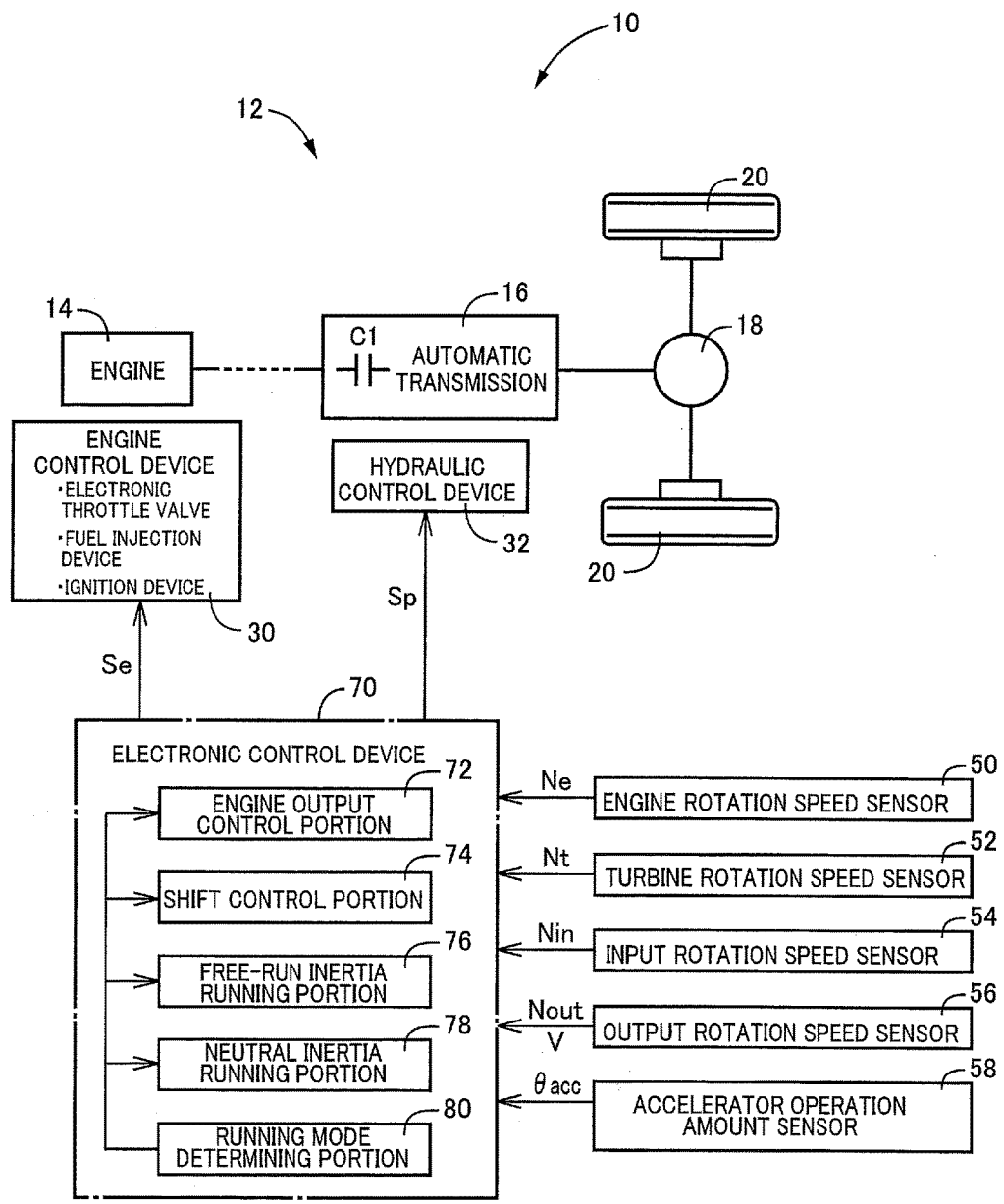
FIG. 1 is a diagram for explaining a general configuration of a drive device included in a vehicle to which the present invention is applied, and is a diagram for explaining a main portion of a control system in the vehicle.

FIG. 1 is a diagram for explaining a general configuration of a drive device 12 included in a vehicle 10 to which the present invention is applied, and is a diagram for explaining a main portion of a control system for various controls in the vehicle 10. In FIG. 1, the drive device 12 includes an engine 14 and an automatic transmission 16 and the power of the engine 14 acting as a drive force source is transmitted from the automatic transmission 16 via a differential gear device 18 to left and right wheels 20. For example, a damper device and a power transmission device such as a torque converter are disposed between the engine 14 and the automatic transmission 16, and a motor generator acting as a drive force source can also be disposed therebetween.

The engine 14 includes an engine control device 30 having various pieces of equipment necessary for output control of the engine 14, such as an electronic throttle valve, a fuel injection device, and an ignition device. The electronic throttle valve, the fuel injection device, and the ignition device control an intake air amount, a fuel supply amount, and ignition timing, respectively, and are basically controlled depending on an operation amount of an accelerator pedal (an accelerator operation amount) θacc corresponding to a drive demand amount for the vehicle 10 from a driver. The fuel injection device can stop the fuel supply (perform a fuel cut F/C) at the time of accelerator-off when the accelerator operation amount θacc is determined as being zero even during running of the vehicle.

The automatic transmission 16 is a stepped automatic transmission of a planetary gear type etc., having a plurality of gear stages with different gear ratios e established depending on engaged/released states of a plurality of hydraulic friction engagement devices (clutches and brakes). In the automatic transmission 16, each of the hydraulic friction engagement devices is subjected to engagement/release control by electromagnetic hydraulic control valves, switching valves, etc. disposed in a hydraulic control device 32 so that a predetermined gear stage is established depending on a driver's accelerator operation, a vehicle speed V, etc. A clutch C1 acts as an input clutch of the automatic transmission 16 and is a hydraulic friction engagement device subjected to the engagement/release control by the hydraulic control device 32 in the same way. The clutch C1 corresponds to a connecting/disconnecting device connecting and disconnecting the engine 14 and the wheels 20. The automatic transmission 16 may be implemented by using a continuously variable transmission of a belt type etc., instead of a stepped transmission.

The vehicle 10 includes an electronic control device 70 including a running control device of the vehicle 10 related to the engagement/release control of the clutch C1, for example. The electronic control device 70 includes a so-called microcomputer including a CPU, a RAM, a ROM, and an I/O interface, for example, and the CPU executes signal processes in accordance with a program stored in advance in the ROM, while utilizing a temporary storage function of the RAM, to provide various controls of the vehicle 10. For example, the electronic control device 70 provides the output control of the engine 14, the shift control of the automatic transmission 16, the torque capacity control of the clutch C1, etc., and is configured separately as needed for the engine control, the hydraulic control, etc. The electronic control device 70 is supplied with each of various signals (e.g., an engine rotation speed Ne that is a rotation speed of the engine 14, a turbine rotation speed Nt that is a rotation speed of a turbine shaft of the torque converter, a transmission input rotation speed Nin that is an input rotation speed of the automatic transmission 16, a transmission output rotation speed Nout that is an output rotation speed of the automatic transmission 16 corresponding to the vehicle speed V, and the accelerator operation amount θacc) based on detection values from various sensors (e.g., an engine rotation speed sensor 50, a turbine rotation speed sensor 52, an input rotation speed sensor 54, an output rotation speed sensor 56, and an accelerator operation amount sensor 58). The electronic control device 70 outputs, for example, an engine output control command signal Se for the output control of the engine 14, an oil pressure command signal Sp for the engagement control of the clutch C1 and the shift control of the automatic transmission 16 to the engine control device 30 and the hydraulic control device 32, respectively.

The electronic control device 70 functionally includes an engine output control means, i.e., an engine output control portion 72, a shift control means, i.e., a shift control portion 74, a free-run inertia running means, i.e., a free-run inertia running portion 76, a neutral inertia running means, i.e., a neutral inertia running portion 78, and a running mode determining means, i.e., a running mode determining portion 80.

The engine output control portion 72 outputs to the engine control device 30 the engine output control command signals Se controlling opening/closing of the electronic throttle valve, controlling the fuel injection amount from the fuel injection device, and controlling the ignition timing of the ignition device such that a requested engine torque Te (hereinafter, a demand engine torque Tedem) is acquired, for example. The engine output control portion 72 calculates a demand drive force Fdem as a drive demand amount based on the actual accelerator operation amount θacc and vehicle speed V from a relationship (a drive force map) not depicted stored in advance between the vehicle speed V and the demand drive force Fdem by using the accelerator operation amount θacc as a parameter, for example, and calculates the demand engine torque Tedem at which the demand drive force Fdem is acquired, based on the gear ratio e at the current gear stage of the automatic transmission 16 etc. The drive demand amount can be implemented by using not only the demand drive force Fdem [N] at the wheels 20 but also a demand drive torque Touttgt [Nm] at the wheels 20, a demand drive power [W] at the wheels 20, a demand transmission output torque of the automatic transmission 16, a demand transmission input torque of the automatic transmission 16, and the demand engine torque Tedem. The drive demand amount can also be implemented by simply using the accelerator operation amount θacc [%], a throttle valve opening degree [%], an intake air amount [g/sec] of the engine 14, etc.

The shift control portion 74 provides the shift control of the automatic transmission 16. Specifically, the shift control portion 74 makes a shift determination based on a vehicle state indicated by the actual vehicle speed V and the drive demand amount from a known relationship (a shift map, a shift diagram) defined and stored in advance by using the vehicle speed V and the drive demand amount as variables. If it is determined that a shift of the automatic transmission 16 should be performed, the shift control portion 74 outputs to the hydraulic control device 32 the oil pressure command signal Sp for engaging and/or releasing the hydraulic friction engagement devices involved with the shift of the automatic transmission 16 such that the determined gear stage is achieved.

The engine output control portion 72 and the shift control portion 74, the free-run inertia running portion 76, and the neutral inertia running portion 78 perform three respective running modes depicted in FIG. 2. The engine output control portion 72 and the shift control portion 74 perform a normal running mode (hereinafter also referred as "normal running") performed by using the power of the engine 14 with the engine 14 and the wheels 20 coupled (i.e., with the clutch C1 engaged). Specifically, as described above, the engine output control portion 72 provides the output control of the engine 14 such that the drive demand amount is acquired, and the shift control portion 74 provides the shift control of the automatic transmission 16 including engagement of the clutch C1 based on the vehicle state indicated by the actual vehicle speed V and the drive demand amount from the shift map.

The free-run inertia running portion 76 performs a free-run inertia running mode (hereinafter also referred as "free-run inertia running") (also referred to as a free-run coasting mode) that is an inertia running mode performed by separating the engine 14 and the wheels 20 and stopping the engine 14 during running. Specifically, the free-run inertia running portion 76 releases the clutch C1 to separate the engine 14 from the wheels 20 and performs the fuel cut F/C stopping the fuel supply to the engine 14, thereby performing the inertia running mode (also referred to as a coasting mode) with the rotation of the engine 14 stopped. Since the release of the clutch C1 results in an engine brake force of substantially zero in the free-run inertia running mode, a reduction in running resistance extends the running distance in the inertia running mode, and fuel consumption can further be improved in combination with the fuel cut F/C.

The neutral inertia running portion 78 performs a neutral inertia running mode (hereinafter also referred as "neutral inertia running") (also referred to as an N-coasting mode) that is an inertia running mode performed by separating the engine 14 and the wheels 20 and operating the engine 14 in a self-sustaining manner during running. Specifically, the neutral inertia running portion 78 releases the clutch C1 to separate the engine 14 from the wheels 20 and supplies fuel to the engine 14 to perform the inertia running mode with the engine 14 operated in an idling state. Although the engine 14 is operated in the idling state in the neutral inertia running mode, since the clutch C1 is released, the running distance in the inertia running mode is extended and the effect of improving fuel consumption is acquired to some extent.

The running mode determining portion 80 determines in which mode the vehicle should be placed from the three running modes, i.e., the normal running mode, the free-run inertia running mode, and the neutral inertia running mode, and switches to the determined running mode or determines which mode the vehicle is actually running in. Specifically, for example, during accelerator-on when the accelerator operation amount θacc is not determined as being zero, the running mode determining portion 80 basically determines to perform the normal running mode. On the other hand, for example, if the accelerator is continuously turned off for a predetermined time or longer during the normal running mode, the running mode determining portion 80 determines to perform the free-run inertia running mode or the neutral inertia running mode based on predefined inertia running conditions. The inertia running conditions are defined in advance such that the free-run inertia running mode and the neutral inertia running mode are performed in respective regions having completely different vehicle states by using classification according to the vehicle speed V and a brake operation force, for example. Alternatively, the inertia running conditions may be defined in advance such that, for example, the free-run inertia running mode with a high fuel consumption improvement effect is basically performed and that the neutral inertia running mode is performed if the engine 14 must be warmed up, if a battery must be charged by the power of the engine 14, or if a mechanical oil pump must be driven by the power of the engine 14. Alternatively, the inertia running conditions may be defined in advance such that the free-run inertia running mode and the neutral inertia running mode are performed in regions of vehicle states partially overlapping with each other by using classification according to the vehicle speed V and a brake operation force, for example, and may be defined in advance such that either one is executed in the overlapping region based on the necessity of the warm-up of the engine 14 etc.

If a predetermined return condition for returning to the normal running mode (i.e., a cancel condition for canceling the inertia running mode) is satisfied during the free-run inertia running mode or the neutral inertia running mode, the running mode determining portion 80 cancels the inertia running mode and determines to return to the normal running mode. The predetermined return condition is any one of the following multiple types of conditions. For example, the return condition is a condition A that is an increase in the drive demand amount (e.g., accelerator-on). Alternatively, the return condition is a condition B such as a brake operation force equal to or greater than a predetermined brake operation force, a steering angle equal to or greater than a predetermined steering angle, or an inter-vehicle distance equal to or less than a predetermined inter-vehicle distance. If the condition B is satisfied, an engine brake running mode (hereinafter also referred as "engine brake running") may be performed that applies an engine brake from the driven rotation of the engine 14 with the engine 14 and the wheels 20 coupled, instead of returning to the normal running mode.

The running mode determining portion 80 determines the running mode of the actual running being performed out of the normal running mode, the free-run inertia running mode, and the neutral inertia running mode, based on a state of the engine 14 and a state of the clutch C1 as depicted in FIG. 2, for example. Alternatively, if a flag indicative of the running mode is defined in advance, the running mode determining portion 80 may determine the running mode of the actual running being performed based on the actual flag.

If the return condition at the time of return from the free-run inertia running mode or the neutral inertia running mode to the normal running mode is the condition A (e.g., accelerator-on), it is desirable to promptly accelerate the vehicle 10. For prompt acceleration, for example, it is conceivable that a time until engagement of the clutch C1 is shortened to improve the responsiveness until generation of a drive force or that an absolute value of the drive force capable of being generated after the engagement of the clutch C1 is increased to enhance acceleration performance after generation of the drive force. In the case of return from the neutral inertia running mode to the normal running mode, the clutch C1 is engaged after the synchronization control of the engine rotation speed Ne is provided such that a differential rotation speed ΔNc1 (=Nin−Nt) of the clutch C1 becomes substantially zero so as to suppress an engagement shock of the clutch C1. In contrast, in the case of return from the free-run inertia running mode to the normal running mode, in addition to providing the synchronization control of the engine rotation speed Ne, the engine 14 must be started before the provision of the synchronization control. Therefore, the responsiveness until the start of generation of the drive force at the time of return becomes inferior in the case of the free-run inertia running mode as compared to the case of the neutral inertia running mode. On one hand, to recover the inferior responsiveness by enhancing the acceleration performance after the start of generation of the drive force, it is conceivable that the gear ratio e of the automatic transmission 16 at the time of return is set on the relatively low vehicle speed side; however, since the engine rotation speed Ne during the synchronization control is made higher, the responsiveness may further deteriorate. On the other hand, to improve the responsiveness itself, it is conceivable that the gear ratio e of the automatic transmission 16 at the time of return is set on the relatively high vehicle speed side; however, since the absolute value of the drive force capable of being generated at the time of return is made smaller, the acceleration performance may deteriorate. Additionally, a down shift may be performed immediately after the return, resulting in a busy shift. Therefore, the respective gear ratios e of the automatic transmission 16 at the time of return to the normal running mode must properly be set for the free-run inertia running mode and the neutral inertia running mode.

Thus, the shift control portion 74 provides return-time gear ratio change control of setting the gear ratio e of the automatic transmission 16 on the high vehicle speed side in the case of return from the free-run inertia running mode to the normal running mode as compared to the case of return from the neutral inertia running mode to the normal running mode. The problem as described above occurs at the time of return on the condition A. Therefore, the shift control portion 74 provides the return-time gear ratio change control at the time of return to the normal running mode associated with an increase in the drive demand amount (e.g., associated with satisfaction of the condition A), and sets the gear ratio e of the automatic transmission 16 to the gear ratio for the normal running mode without providing the return-time gear ratio change control at the time of return to the normal running mode associated with a condition other than an increase in the drive demand amount (e.g., associated with satisfaction of the condition B).

Figure 3:
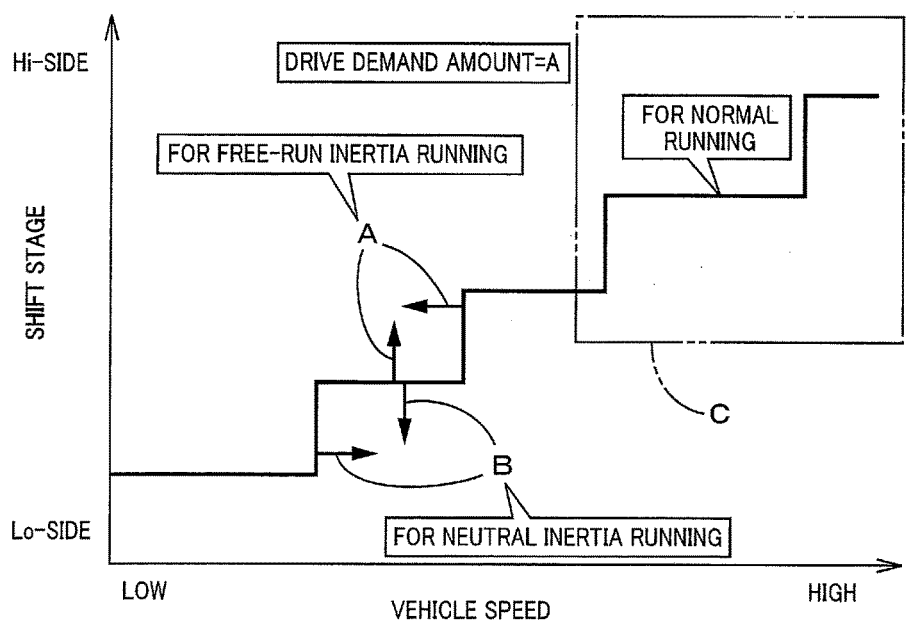
FIG. 3 is a diagram for explaining a gear ratio of an automatic transmission set at the time of return from the inertia running mode and depicts the case of using a normal running shift map.
Figure 4:
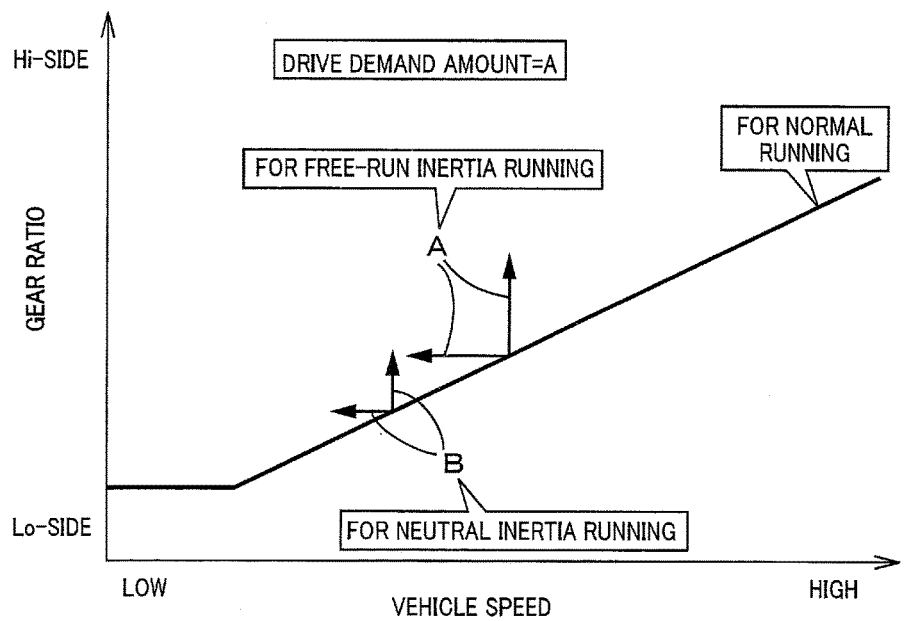
FIG. 4 is a diagram when the automatic transmission is a continuously variable transmission, and the figure being similar to FIG. 3.
Figure 5:
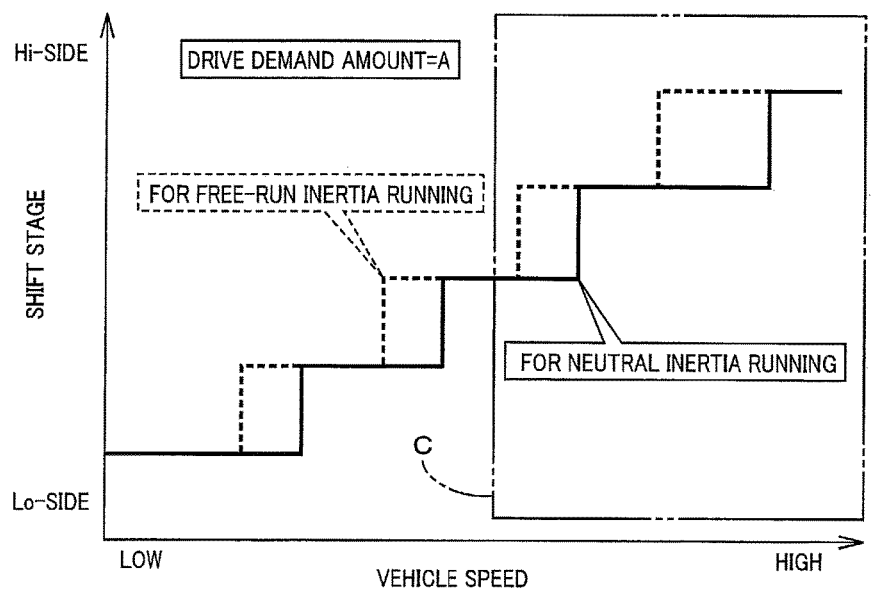
FIG. 5 depicts the case of using an inertia running shift map, and the figure being similar to FIG. 3.
Figure 6:
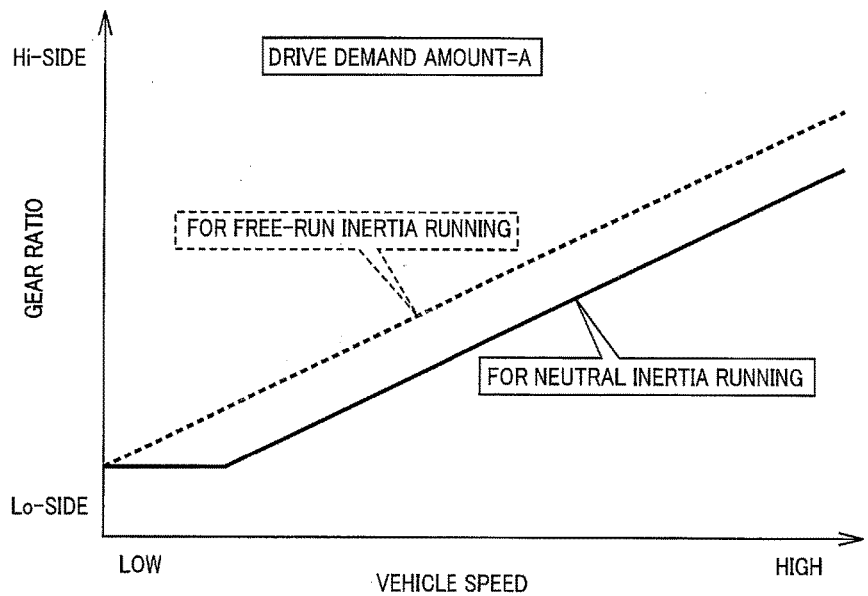
FIG. 6 depicts the case of using the inertia running shift map, and the figure being similar to FIG. 4.

The gear ratio e of the automatic transmission 16 set in the return-time gear ratio change control will hereinafter be described in detail. FIGS. 3, 4, 5, and 6 are diagrams for explaining the gear ratio e of the automatic transmission 16 set at the time of return from the inertia running mode. FIG. 3 is a diagram when the automatic transmission 16 is a stepped transmission, and depicts the case of using a normal running shift map. FIG. 4 is a diagram when the automatic transmission 16 is a continuously variable transmission, and depicts the case of using the normal running shift map. FIG. 5 is a diagram when the automatic transmission 16 is a stepped transmission, and depicts the case of using an inertia running shift map. FIG. 6 is a diagram when the automatic transmission 16 is a continuously variable transmission, and depicts the case of using the inertia running shift map. Even if the automatic transmission 16 is a continuously variable transmission, the gear ratio can be set in stages in a stepped manner and, therefore, the shift maps of FIGS. 3 and 5 are applicable even when the automatic transmission 16 is a continuously variable transmission.

In FIGS. 3 and 4, a solid line represents the normal running shift map used in the shift control during the normal running mode and indicates an example when the drive demand amount is a certain value A. At the time of return from the free-run inertia running mode, for example, as indicated by arrows A of FIG. 3, a gear stage on the high vehicle speed side is set relative to a gear stage (having the same meaning as a gear ratio) determined from the normal running shift map. On the other hand, at the time of return from the neutral inertia running mode, for example, as indicated by arrows B of FIG. 3, a gear stage on the low vehicle speed side is set relative to the gear stage determined from the normal running shift map. Alternatively, the gear stage determined from the normal running shift map may be set at the time of return from the neutral inertia running mode, while a gear stage on the high vehicle speed side may be set relative to the gear stage determined from the normal running shift map at the time of return from the free-run inertia running mode. Alternatively, the gear stage determined from the normal running shift map may be set at the time of return from the free-run inertia running mode, while a gear stage on the low vehicle speed side may be set relative to the gear stage determined from the normal running shift map at the time of return from the neutral inertia running mode. Alternatively, as indicated by arrows A and B of FIG. 4, in the both cases of return from the free-run inertia running mode and return from the neutral inertia running mode, a gear ratio on the high vehicle speed side may be set relative to the gear ratio determined from the normal running shift map, while a gear ratio on the higher vehicle speed side may be set relative to the gear ratio determined from the normal running shift map in the case of return from the free-run inertia running mode as compared to the case of return from the neutral inertia running mode.

Alternatively, as depicted in FIGS. 5 and 6, a predefined free-run inertia running shift map as indicated by a broken line and a predefined neutral inertia running shift map as indicated by solid lines may be defined and stored in advance for determining a gear stage (having the same meaning as a gear ratio) of the automatic transmission 16 at the time of return from the free-run inertia running mode to the normal running mode and for determining a gear stage (having the same meaning as a gear ratio) of the automatic transmission 16 at the time of return from the neutral inertia running mode to the normal running mode, respectively. Both the free-run inertia running shift map and the neutral inertia running shift map indicate an example when the drive demand amount is the certain value A. The free-run inertia running shift map has the gear ratio e of the automatic transmission 16 set on the high vehicle speed side as compared to the neutral inertia running shift map. Either the free-run inertia running shift map or the neutral inertia running shift map may be the same as the normal running shift map.

The return-time gear ratio change control may not necessarily be provided at the time of return to the normal running mode associated with an increase in the drive demand amount and may be provided at the time of return when the vehicle state is within a region C surrounded by dashed-two dotted lines of FIGS. 3 and 5, for example. Therefore, the maps as depicted in FIGS. 3 and 5 may be set only within the region C, for example. As described above, the free-run inertia running mode and the neutral inertia running mode are performed in the regions of completely different vehicle states or the regions of vehicle states partially overlapping with each other, or either one is performed in the region of the same vehicle state based on the necessity of the warm-up of the engine 14 etc. If the free-run inertia running mode and the neutral inertia running mode cannot be performed in the region of the same vehicle state, the gear ratio set at the time of return from the free-run inertia running mode is possibly on the lower vehicle speed side than the gear ratio set at the time of return from the neutral inertia running mode. The technical concept of the return-time gear ratio change control is to prescribe how to set the gear ratio used at the time of return to the normal running mode, rather than to compare the absolute values of the gear ratios. Therefore, even if the free-run inertia running mode and the neutral inertia running mode cannot be performed in the region of the same vehicle state, the technical concept of the return-time gear ratio change control is reflected. In other words, for example, even if any one of the free-run inertia running mode and the neutral inertia running mode is performed only in the region C and the other is performed only outside the region C, the technical concept of the return-time gear ratio change control is reflected. In this case, the map corresponding to each mode of running may be set only in the region in which the mode of running is performed.

Figure 7:
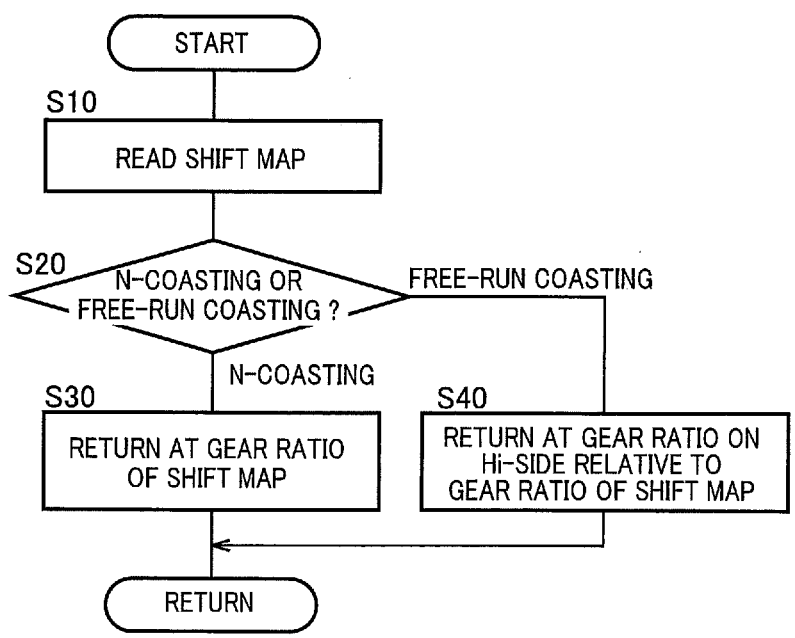
FIG. 7 is a flowchart for explaining a main portion of the control operation of an electronic control device, i.e., the control operation for preventing a user from having a feeling of strangeness at the time of return from the inertia running mode to the normal running mode in terms of the responsiveness and the acceleration performance.
Figure 8:
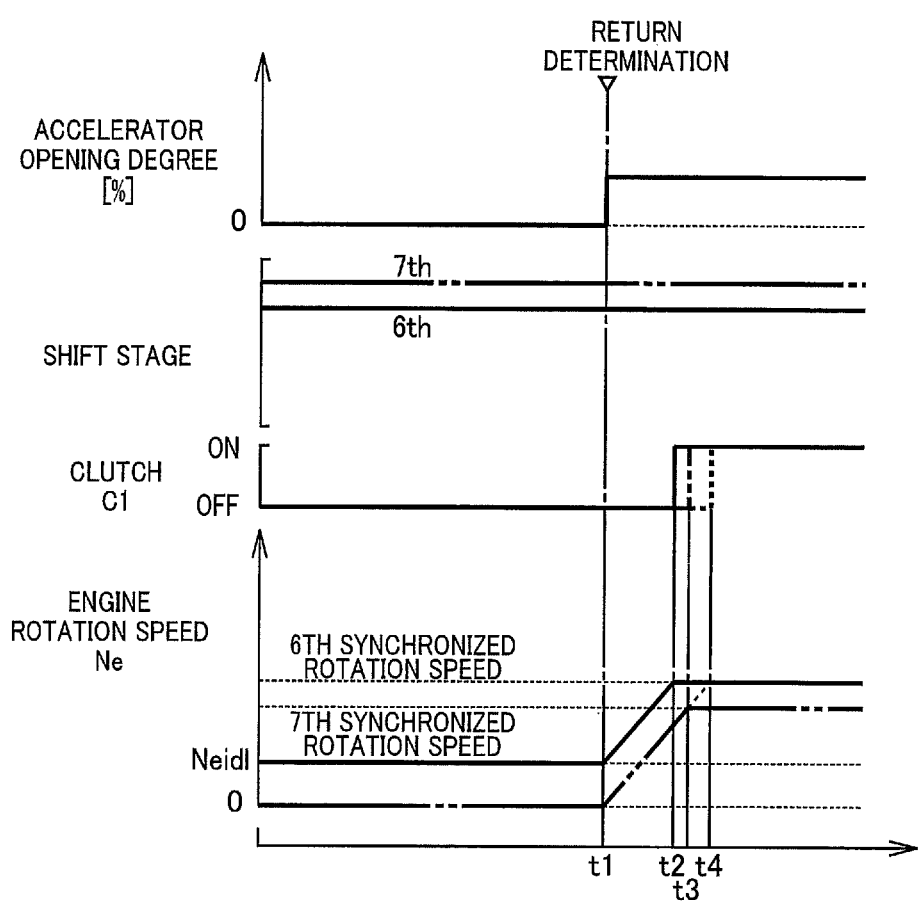
FIG. 8 is a time chart when the control operation depicted in the flowchart of FIG. 7 is executed.

FIG. 7 is a flowchart for explaining a main portion of the control operation of the electronic control device 70, i.e., the control operation for preventing a user from having a feeling of strangeness at the time of return from the inertia running mode to the normal running mode in terms of the responsiveness and acceleration performance, and is repeatedly executed with an extremely short cycle time, for example, on the order of a few msec to a few tens of msec. The flowchart of FIG. 7 is based on the assumption that the inertia running mode is performed because the accelerator is turned off during the normal running mode. FIG. 8 is a time chart when the control operation depicted in the flowchart of FIG. 7 is executed.

In FIG. 7, first, at step (hereinafter, step will be omitted) S10 corresponding to the shift control portion 74, for example, the normal running shift map is read. At S20 corresponding to the running mode determining portion 80, the running mode of actual inertia running being performed is determined out of the free-run inertia running mode and the neutral inertia running mode. If it is determined at S20 that the running mode is the neutral inertia running mode, for example, the gear ratio determined from the normal running shift map is set as the gear ratio of the automatic transmission 16 at the time of return to the normal running mode at S30 corresponding to the shift control portion 74. If it is determined at S20 that the running mode is the free-run inertia running mode, for example, a gear ratio on the high vehicle speed side is set relative to the gear ratio determined from the normal running shift map as the gear ratio of the automatic transmission 16 at the time of return to the normal running mode at S40 corresponding to the shift control portion 74. At S30 and S40, for example, the hydraulic friction engagement devices of the automatic transmission 16 involved with the establishment of the set gear stage are engaged before returning to the normal running mode except the clutch C1.

In FIG. 8, a solid line indicates the case of the neutral inertia running mode and a dashed-two dotted line indicates the case of the free-run inertia running mode, while a broken line indicates a comparison example in the case of the free-run inertia running mode. In the example of the neutral inertia running mode indicated by a solid line, a sixth-speed gear stage (6th) determined from the normal running shift map is set as the gear stage of the automatic transmission 16 at the time of return to the normal running mode. In the example of the neutral inertia running mode, partially because the engine rotation speed Ne is set to the idle rotation speed Neidl, a time from a return determination (time t1) to the completion of the synchronization control of the engine rotation speed Ne (time t2) is made relatively short. Additionally, after the engagement of the clutch C1, the drive force is generated at the sixth-speed gear stage on the relatively low vehicle speed side. In the comparison example of the free-run inertia running mode indicated by a broken line, the sixth-speed gear stage is set as is the case with the neutral inertia running mode. Therefore, although the drive force is generated at the sixth-speed gear stage after the engagement of the clutch C1 in this comparison example, partially because the engine 14 must be started, a relatively long time is required from the return determination (time t1) to the completion of the synchronization control of the engine rotation speed Ne (time t4). In contrast to this comparison example, a seventh-speed gear stage (7th) on the higher vehicle speed side than the neutral inertia running mode is set in the example of the free-run inertia running mode indicated by a dashed-two dotted line. Therefore, the time from the return determination (time t1) to the completion of the synchronization control of the engine rotation speed Ne (time t3) is shortened in this example of the free-run inertia running mode as compared to the comparison example. Although the drive force is generated at the seventh-speed gear stage after the engagement of the clutch C1 in this example of the free-run inertia running mode, partially because the engine 14 is originally stopped, it is considered that a phenomenon of a small drive force at the time of return to the normal running mode hardly gives a feeling of strangeness to the user.

As described above, according to this example, by changing the gear ratio e of the automatic transmission 16 at the time of return to the normal running mode based on the state of the engine 14 during the inertia running mode, the gear ratio on the high vehicle speed side is used in the case of the free-run inertia running mode for returning to the normal running mode so as to put importance on the time until synchronization of the engine rotation speed Ne (in other words, the responsiveness until the start of generation of the drive force), while the gear ratio on the low vehicle speed side is used in the case of the neutral inertia running mode for returning to the normal running mode so as to put importance on the absolute value of the drive force capable of being generated after the return (in other words, the acceleration performance after the start of generation of the drive force). Therefore, a user can be prevented from having a feeling of strangeness at the time of return from the inertia running mode to the normal running mode in terms of the responsiveness and the acceleration performance.

According to this example, the return-time gear ratio change control is provided at the time of return to the normal running mode associated with an increase in the drive demand amount while the gear ratio e of the automatic transmission 16 is set to the gear ratio for the normal running mode at the time of return to the normal running mode associated with a condition other than an increase in the drive demand amount and, therefore, although if the return-time gear ratio change control is provided when it is not the time of return to the normal running mode associated with an increase in the drive demand amount, the engagement shock of the clutch C1 varies due to a difference in the state of the engine 14 and possibly gives a feeling of strangeness to a user, the feeling of strangeness is avoided because the return-time gear ratio change control is not provided so as not to put importance on the responsiveness until the start of generation of the drive force when it is not the time of return to the normal running mode associated with an increase in the drive demand amount.

According to this example, since the gear ratio e of the automatic transmission 16 is set on the high vehicle speed side relative to the gear ratio determined from the normal running shift map in the case of return from the free-run inertia running mode as compared to the case of return from the neutral inertia running mode, the gear ratio e of the automatic transmission 16 can certainly be set on the high vehicle speed side in the case of return from the free-run inertia running mode as compared to the case of return from the neutral inertia running mode.

According to this example, since the free-run inertia running shift map has the gear ratio e of the automatic transmission 16 set on the high vehicle speed side as compared to the neutral inertia running shift map, the gear ratio e of the automatic transmission 16 can certainly be set on the high vehicle speed side in the case of return from the free-run inertia running mode as compared to the case of return from the neutral inertia running mode.

According to this example, since the gear ratio e of the automatic transmission 16 at the time of return from the neutral inertia running mode is the gear ratio e of the automatic transmission 16 for the normal running mode, the gear ratio e of the automatic transmission 16 can be set on the high vehicle speed side in the case of return from the free-run inertia running mode.

Another example of the present invention will be described. In the following description, the portions mutually common to the examples are denoted by the same reference numerals and will not be described.

SECOND EXAMPLE

Although the gear ratio at the time of return is preliminarily established in the automatic transmission 16 except the engagement of the clutch C1 during the inertia running mode before returning to the normal running mode in the first example, alternatively, the gear ratio at the time of return is established in the automatic transmission 16 immediately before returning to the normal running mode (preferably, when a return to the normal running mode is determined) in this example.

Figure 9:
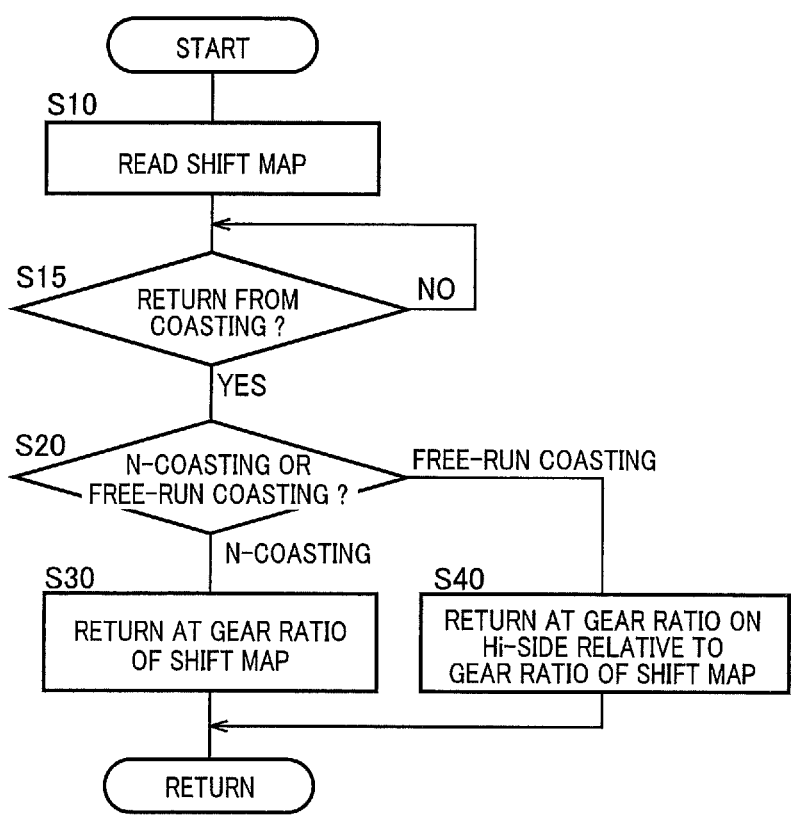
FIG. 9 is a flowchart for explaining a main portion of the control operation of the electronic control device, i.e., the control operation for preventing a user from having a feeling of strangeness at the time of return from the inertia running mode to the normal running mode in terms of the responsiveness and the acceleration performance, and depicts another example corresponding to FIG. 7.

FIG. 9 is a flowchart for explaining a main portion of the control operation of the electronic control device 70, i.e., the control operation for preventing a user from having a feeling of strangeness at the time of return from the inertia running mode to the normal running mode in terms of the responsiveness and the acceleration performance, and is repeatedly executed with an extremely short cycle time, for example, on the order of a few msec to a few tens of msec. FIG. 9 depicts another example corresponding to FIG. 7 and steps different from FIG. 7 will mainly be described.

In FIG. 9, after S10 described above, a return from the inertia running mode is determined at S15 corresponding to the running mode determining portion 80. If the determination of S15 is negative, S15 is repeatedly executed. If a return from the inertia running mode is determined and the determination of S15 is affirmative, the running mode of actual inertia running being performed is determined out of the free-run inertia running mode and the neutral inertia running mode at S20 corresponding to the running mode determining portion 80. At S30 and S40, for example, the hydraulic friction engagement devices of the automatic transmission 16 involved with the establishment of the set gear stage are engaged for returning to the normal running mode.

As described above, since this example is different from the first example only in the timing of establishing the gear ratio at the time of return in the automatic transmission 16 and the return-time gear ratio change control is provided in the same way, the same effect as the first example is acquired.

Although the examples of the present invention have been described in detail with reference to the drawings, the present invention is also applied in other forms.

For example, although the clutch C1 making up a portion of the automatic transmission 16 is exemplified as the connecting/disconnecting device separating the engine 14 and the wheels 20 in the examples, this is not a limitation.

For example, the clutch C1 may be disposed independently of the automatic transmission 16. If the automatic transmission 16 is, for example, a belt type continuously variable transmission, the clutch C1 is disposed independently of the automatic transmission 16, and the connecting/disconnecting device may be a known forward/backward switching device included in the vehicle along with the belt type continuously variable transmission, or an engagement device included in the forward/backward switching device.

The above description is merely an embodiment and the present invention can be implemented in variously modified and improved forms based on the knowledge of those skilled in the art.

NOMENCLATURE OF ELEMENTS

10: vehicle
14: engine
16: automatic transmission (transmission)
20: wheels
70: electronic control device (running control device)
C1: clutch (connecting/disconnecting device)

The invention claimed is:

1. A running control device of a vehicle including an engine, a connecting/disconnecting device separating the engine and wheels, and a transmission transmitting power of the engine toward the wheels, the running control device being configured to execute a normal running mode performed by using the power of the engine with the engine and the wheels coupled, a free-run inertia running mode performed by separating the engine and the wheels and stopping the engine during running, and a neutral inertia running mode performed by separating the engine and the wheels and operating the engine in a self-sustaining manner during running,
   the running control device setting a gear ratio of the transmission on a high vehicle speed side in the case of return from the free-run inertia running mode to the normal running mode as compared to the case of return from the neutral inertia running mode to the normal running mode.

2. The running control device of claim 1, wherein
   the running control device includes a condition that is an increase in a drive demand amount as one of a plurality of conditions for returning to the normal running mode,
   the running control device executes a control of setting the gear ratio of the transmission on the high vehicle speed side at the time of return to the normal running mode associated with the increase in the drive demand amount, and
   the running control device sets the gear ratio of the transmission to a normal running mode gear ratio for the normal running mode at the time of return to the normal running mode associated with a condition other than the increase in the drive demand amount.

3. The running control device of claim 1, wherein
   the running control device has a predefined relationship determining a normal running mode gear ratio of the transmission for the normal running mode, and wherein
   the running control device sets the gear ratio of the transmission on the high vehicle speed side relative to the normal running mode gear ratio determined from the predefined relationship in the case of return from the free-run inertia running mode to the normal running mode as compared to the case of return from the neutral inertia running mode to the normal running mode.

4. The running control device of claim 1, wherein
the running control device has a predefined relationship for free-run inertia running mode determining a free-run inertial running mode gear ratio of the transmission at the time of return from the free-run inertia running mode to the normal running mode and a predefined relationship for neutral inertia running mode determining a neutral inertial running mode gear ratio of the transmission at the time of return from the neutral inertia running mode to the normal running mode, and wherein
the relationship for free-run inertia running mode has the free-run inertial running mode gear ratio of the transmission set on the high vehicle speed side as compared to the relationship for neutral inertia running mode.

5. A running control device of a vehicle including an engine, a connecting/disconnecting device separating the engine and wheels, and a transmission transmitting power of the engine toward the wheels, the running control device being configured to execute a normal running mode performed by using the power of the engine with the engine and the wheels coupled, a free-run inertia running mode that is an inertia running mode performed by separating the engine and the wheels and stopping the engine during running, and a neutral inertia running mode that is an inertia running mode performed by separating the engine and the wheels and operating the engine in a self-sustaining manner during running,
the running control device having a predefined relationship determining a normal running mode gear ratio of the transmission for the normal running mode,
a gear ratio of the transmission being set on a high vehicle speed side relative to the normal running mode gear ratio determined from the predefined relationship in the case of return from the free-run inertia running mode to the normal running mode as compared to the case of return from the neutral inertia running mode to the normal running mode.

6. A running control device of a vehicle including an engine, a connecting/disconnecting device separating the engine and wheels, and a transmission transmitting power of the engine toward the wheels, the running control device being configured to execute a normal running mode performed by using the power of the engine with the engine and the wheels coupled, a free-run inertia running mode that is an inertia running mode performed by separating the engine and the wheels and stopping the engine during running, and a neutral inertia running mode that is an inertia running mode performed by separating the engine and the wheels and operating the engine in a self-sustaining manner during running,
the running control device having a predefined relationship for free-run inertia running mode determining a free-run inertial running mode gear ratio of the transmission at the time of return from the free-run inertia running mode to the normal running mode and a predefined relationship for neutral inertia running mode determining a neutral inertial running mode gear ratio of the transmission at the time of return from the neutral inertia running mode to the normal running mode,
the relationship for free-run inertia running mode having the free-run inertial running mode gear ratio of the transmission set on the high vehicle speed side as compared to the relationship for neutral inertia running mode.

7. The running control device of claim 1, wherein a neutral inertial running mode gear ratio of the transmission at the time of return from the neutral inertia running mode to the normal running mode is a normal running mode gear ratio of the transmission for the normal running mode.

\* \* \* \* \*